(12) United States Patent
Heym et al.

(10) Patent No.: US 8,312,604 B2
(45) Date of Patent: Nov. 20, 2012

(54) LOCK DEFLECTION DEVICE

(75) Inventors: Axel Heym, Berlin (DE); Hiromichi Yoshikawa, Berlin (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/006,242

(22) Filed: Jan. 13, 2011

(65) Prior Publication Data
US 2011/0107561 A1 May 12, 2011

Related U.S. Application Data

(63) Continuation of application No. PCT/EP2009/058925, filed on Jul. 13, 2009.

(30) Foreign Application Priority Data

Aug. 13, 2008 (DE) .................. 10 2008 037 963

(51) Int. Cl.
*A44B 11/04* (2006.01)
(52) U.S. Cl. .................. 24/593.1; 24/DIG. 51; 297/471
(58) Field of Classification Search .................. None
See application file for complete search history.

(56) References Cited

U.S. PATENT DOCUMENTS

| | | | | | |
|---|---|---|---|---|---|
| 4,871,190 | A | * | 10/1989 | Willey | 280/801.1 |
| 5,058,244 | A | * | 10/1991 | Fernandez | 24/170 |
| 5,100,176 | A | | 3/1992 | Ball et al. | |
| 5,548,874 | A | * | 8/1996 | Mishina et al. | 24/170 |
| 5,870,816 | A | * | 2/1999 | McFalls et al. | 29/434 |
| 7,712,194 | B2 | * | 5/2010 | Fyhr | 24/171 |
| 7,963,562 | B2 | * | 6/2011 | Wendt et al. | 280/806 |
| 7,996,964 | B2 | * | 8/2011 | Wendt et al. | 24/593.1 |
| 2006/0138852 | A1 | | 6/2006 | Ichida | |
| 2009/0025193 | A1 | * | 1/2009 | Fyhr | 24/593.1 |
| 2009/0288275 | A1 | | 11/2009 | Wendt et al. | |

FOREIGN PATENT DOCUMENTS

| | | |
|---|---|---|
| DE | 30 43 432 A1 | 6/1982 |
| DE | 10 2007 007 702 A1 | 8/2008 |
| EP | 1 676 760 A1 | 7/2006 |

OTHER PUBLICATIONS

International Search Report in PCT/EP2009/058925 dated Oct. 13, 2009.

* cited by examiner

*Primary Examiner* — Jack W. Lavinder
(74) *Attorney, Agent, or Firm* — Foley & Lardner LLP

(57) ABSTRACT

A lock deflection device for a motor vehicle for deflecting a seat belt comprises a lock tongue for insertion into a lock buckle and a first contact area connected to the lock tongue around which the seat belt can be laid to deflect the seat belt, so that the seat belt is divided into a shoulder segment and a pelvis segment, which go off in different directions from the first contact area, wherein the first contact area can be moved from an initial position, in which the seat belt can slide along on the deflection device, into a final position. According to the invention, a second contact area connected to the lock tongue is provided, which is arranged to contact the seat belt in case of a first contact area being moved out of the initial position, in order to restrain the seat belt from sliding along on the deflection device, wherein the first contact area is connected to the lock tongue through a movable area of the lock deflection device.

17 Claims, 7 Drawing Sheets

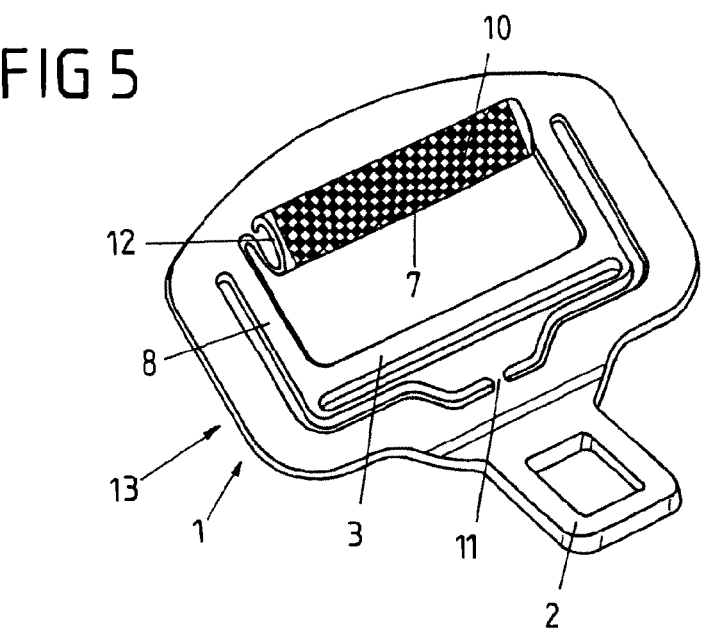
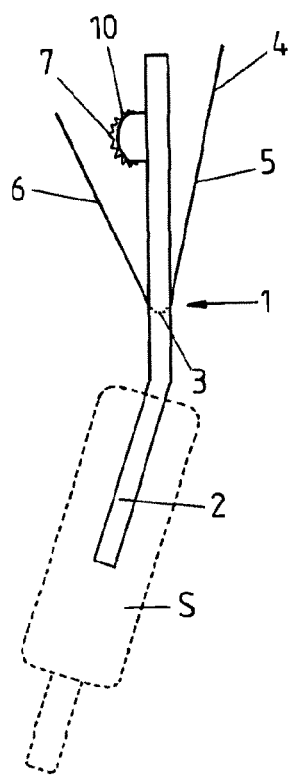
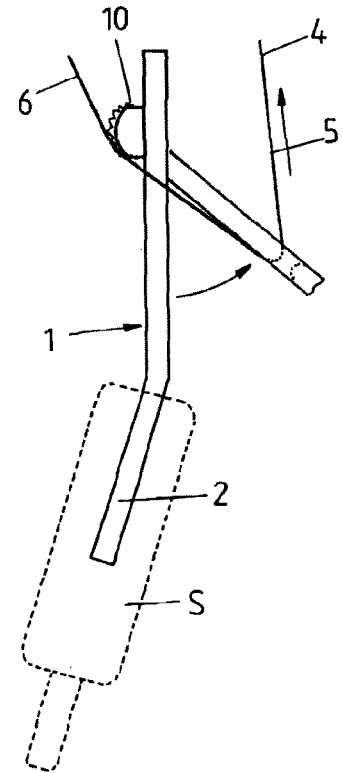

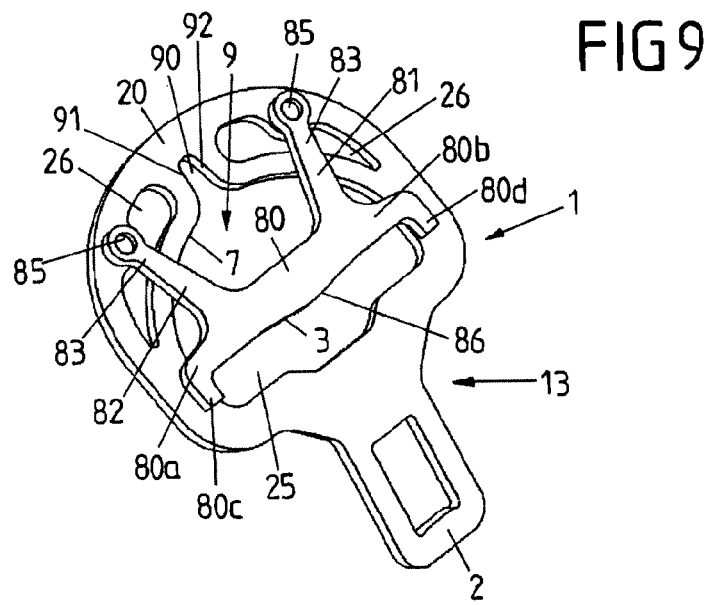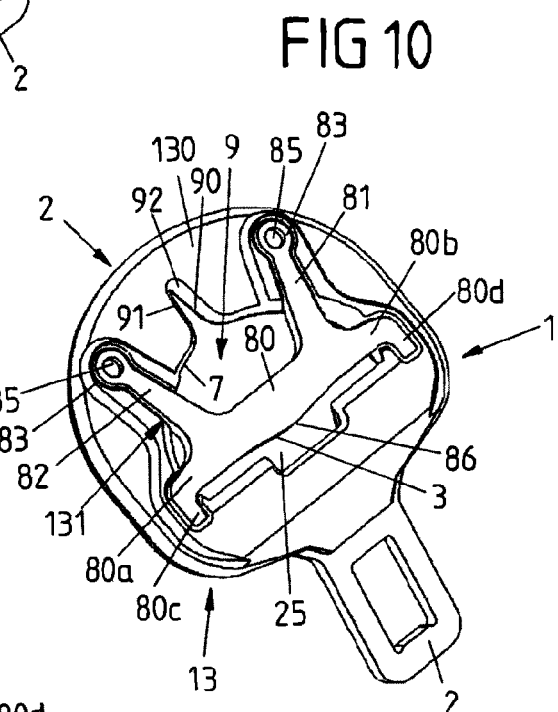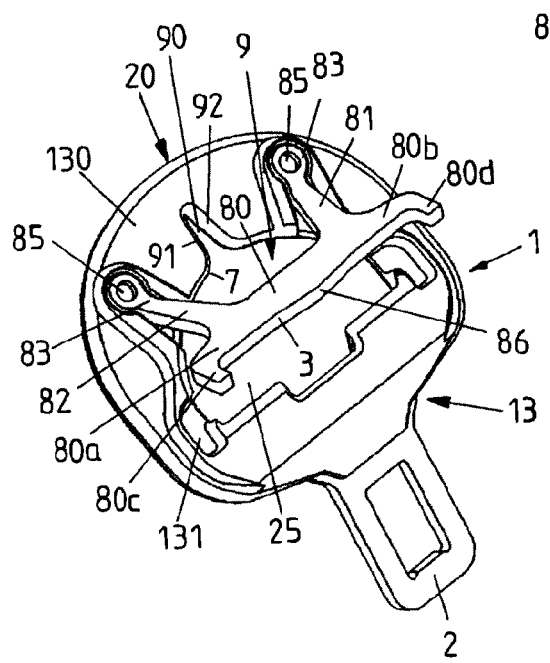

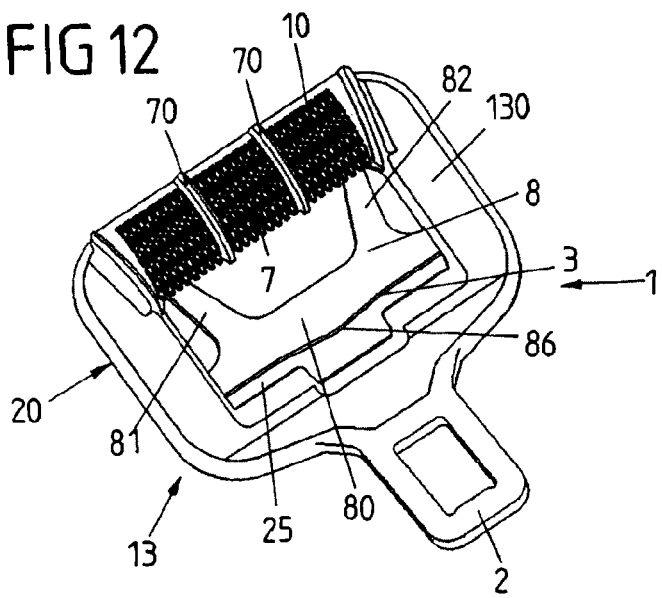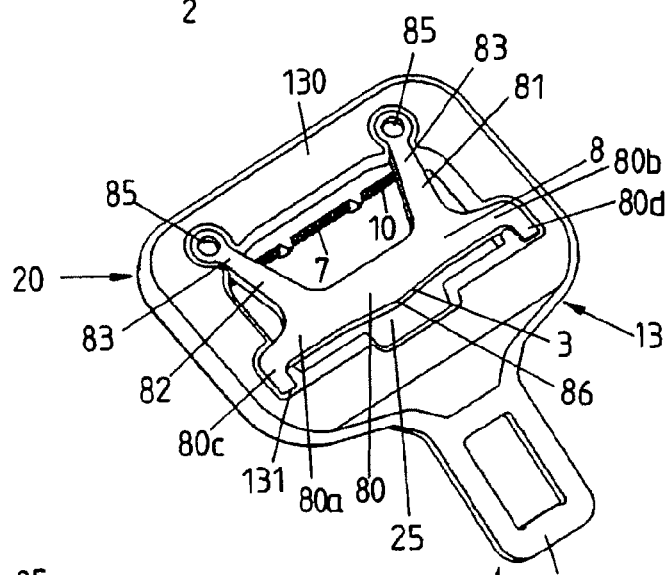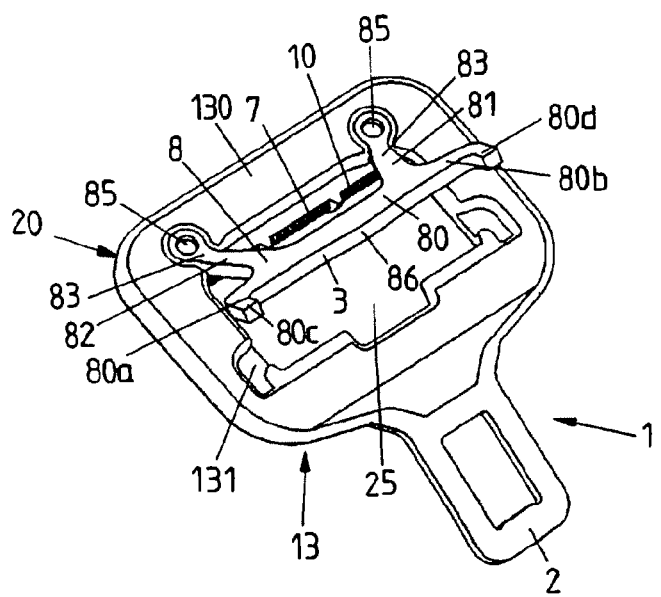

LOCK DEFLECTION DEVICE

CROSS-REFERENCE TO RELATED APPLICATIONS

This is a continuation of International Application PCT/EP2009/058925, which has an international filing date of Jul. 13, 2009; this International Application was not published in English, but was published in German as WO 2010/018040 A1.

BACKGROUND

The invention relates to a lock deflection device for a motor vehicle for deflecting a safety belt, comprising a lock tongue for fastening to a lock buckle and a first contact area connected to the lock tongue, around which the safety belt can be laid for deflecting the safety belt, so that the safety belt is divided into a shoulder segment and a pelvis segment, which go off the first contact area in different directions, wherein the first contact area can be moved out of an initial position, in which the safety belt can slide along on the first contact area, into a final position.

SUMMARY

It is desirable to provide for an improved lock deflection device of the kind mentioned in the beginning.

One disclosed embodiment relates to a lock deflection device for a motor vehicle for deflecting a seat belt, comprising a lock tongue for insertion into a lock buckle and a first contact area connected to the lock tongue around which the seat belt can be laid to deflect the seat belt, so that the seat belt is divided into a shoulder segment and a pelvis segment, which go off in different directions from the first contact area, wherein the first contact area can be moved from an initial position, in which the seat belt can slide along on the deflection device, into a final position, wherein a second contact area connected to the lock tongue, which is arranged and provided to contact the seat belt after the first contact area is moved out of the initial position, in order to restrain the seat belt from sliding along on the deflection device, wherein the first contact area is connected to the lock tongue through a movable area of the lock deflection device.

It is to be understood that the foregoing general description and the following detailed descriptions are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 5: shows a modification of the lock deflection device shown in FIGS. 3 and 4;

FIGS. 6 and 7: show schematical cross sectional views of a lock deflection device according to the kind of FIGS. 3 to 5A;

FIGS. 9-11: show a further embodiment of a lock deflection device according to the invention, wherein the movable area is formed as a separate part that is fastened to the carrier part by means of an additional fastening means, and wherein the second contact area is provided at a tapered cutout of the carrier part;

FIGS. 12-14: show a modification of the lock deflection device shown in the FIGS. 9-11, wherein the movable area is formed as a separate part that is fastened to the carrier part by means of a fastening means, and wherein the second contact area comprises a structured surface;

DETAILED DESCRIPTION

Figure 1:
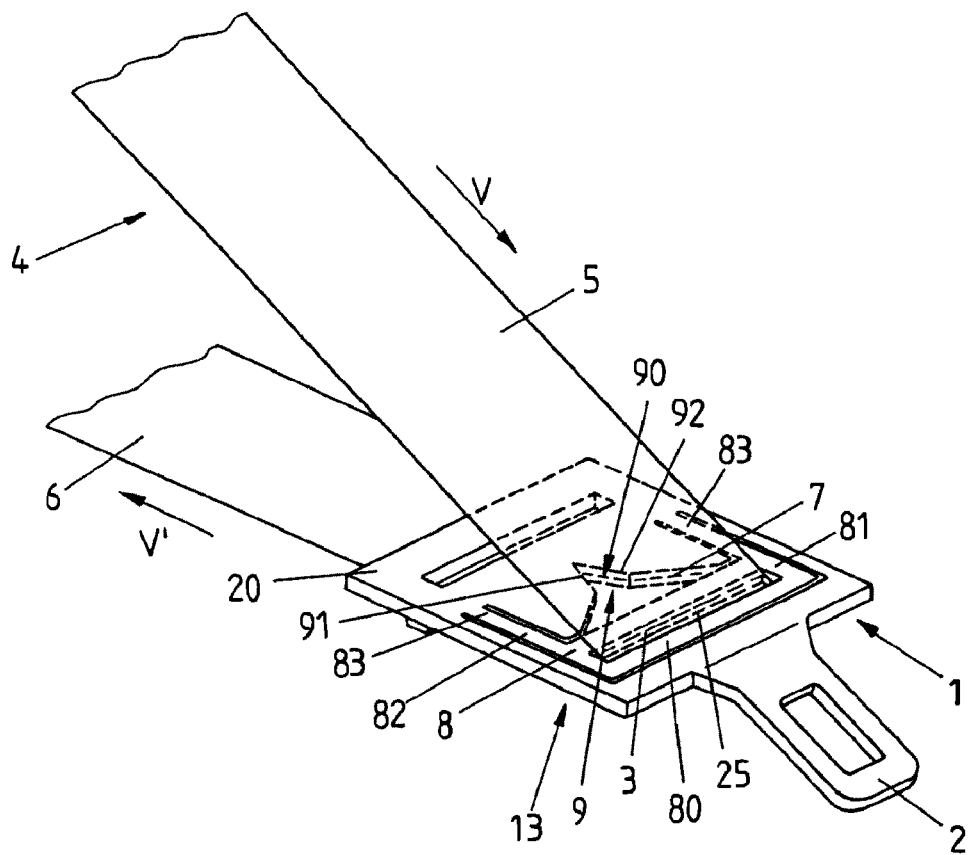
FIG. 1: shows an embodiment of a lock deflection device according to the invention, having a one-piece base body, in case of which the movable area is integrally formed with a carrier part.

According to one aspect of the invention, a separate second contact area connected to the lock tongue is provided, which is arranged and provided to contact the safety belt only in case of a first contact area being moved out of the initial position, in order to restrain the safety belt from sliding along on the first contact area or the deflection device.

Particularly, the first contact area can be moved out of the initial position into the final position for delimiting a resulting force acting on the safety belt i.e., a force delimitation at the lower shoulder segment and at the same time a stopping (the pelvis a belt or of the pelvis segment is fixed to the belt buckle) or a restraining (the sliding-along of the safety belt on the lock deflection device is subjected to a higher resistance) of the pelvis belt takes place.

Thus, a reduction of the thorax indentation of a belted person in the case of a crash, namely by reducing the resulting belt force in the shoulder belt (shoulder segment), is achieved, without having a reduction of the pelvis belt force (pelvis segment force) at the same time.

Advantageous embodiments of the invention are stated in the sub claims and are described in the following.

For connecting the first contact area to the lock tongue, a movable area of the lock deflection device is particularly provided, through which moveable area the first area is connected to the lock tongue of the lock connection device or to a carrier part of the lock deflection device, from which the lock tongue goes off, wherein the latter can be integrally formed with the carrier part.

Preferably, the movable area is arranged and provided to interact with the safety belt in a way that the movable area performs a movement due to a force acting on the shoulder segment, in case of which movement the first contact area is taken along from the initial position into the final position. Particularly, this movement can be a pivoting movement accompanied by a deformation, wherein the deformation is in particular inelastic (plastic) or elastic. For instance, the deformation can be a bending of the movable area, for example by bending a portion of the movable area, so that a portion of the movable area adjoining thereto is pivoted.

Due to this movement of the moveable area, the shoulder segment is released in a way that the resulting force acting on the shoulder segment is delimited.

Furthermore, the movable area preferably comprises a spatial position in the initial position of the first contact area, that prevents the safety belt laid around the first contact area or the movable area from touching (contacting) the first contact area, whereas in case of a first contact area or movable element being moved out of the initial position, the movable area comprises a spatial position in a way that the safety belt laid around the first contact area or the movable area also butts against the second contact area. The movable area preferably forms a pivotable lever, wherein the pivoting axis is preferably running parallel to or in a plane, along which the lock tongue or a carrier part of the movable area extends.

In the present invention, the safety belt does not contact the further rigid contact area (second contact area) of the lock deflection device until the movable area with the first contact area was moved out or pivoted out of its initial place (initial position).

Preferably, the movable area is integrally formed with the lock tongue, or alternatively to this, fastened to the lock tongue or the carrier part, i.e., the movable area can be a separate part, wherein the movable area is bent upon pivoting (see above). Such a bending preferably takes place at the base (end regions) of the movable area, through which the movable area is integrally formed with a part (carrier part) of the lock deflection device or to which it is connected through a fastening means. The first contact area itself can be integrally formed with the movable area.

Preferably, the second contact area is provided spaced apart with respect to the movable area at the lock deflection device, wherein preferably, upon movement of the first contact area into the final position, the second contact area is not changed in its position with respect to the lock tongue.

Furthermore, for fixing to the lock deflection device, the safety belt is preferably not pressed against the second contact area by the movable area, but the safety belt preferably butts against the second contact area by means of the movable area changing its position in space (through a pivoting or bending movement). Therefore, fixation takes place alone due to an interaction (friction) between the safety belt and the second contact area. Preferably, the safety belt contacts the lock deflection device merely through both of the contact areas. Particularly, the safety belt contacts the movable area merely via the first contact area.

Thus, the second contact area serves for fixation of the safety belt to the lock deflection device. Fixation does thereby not mean that a relative movement must be completely suppressed in the crash case. This relative movement can be possible on a higher force level compared to the normal situation of use (movable area in the basic position or initial position). For blocking the sliding-along of the safety belt on the deflection device, the second contact area is particularly provided at a tapered cutout of the lock deflection device (on the carrier part), which particularly comprises the shape of a wedge having a chamfer at the tip of the wedge, wherein the safety belt is drawn into said cutout, particularly into the chamfer, when it starts butting against the second contact area, wherein the safety belt can be clamped at the cutout. In other words, the cutout is delimited by opposite edges converging towards one another, wherein both of the two edges comprise an edge portion, wherein the two edge portions form said chamfer together and meet (at one point), and wherein said end portions enclose a smaller angle than the edge portions delimiting the rest of the cutout and coming off said end portions.

In a variant of the invention, the first contact area is integrally formed with the lock tongue, namely particularly through the movable area and preferably through the carrier part foamed integrally thereon for carrying the movable area, wherein particularly the second contact area is provided at said carrier part, and wherein particularly the lock tongue comes off said carrier part, which lock tongue can be integrally formed with the carrier part, but can also be fastened to the carrier part in any other manner.

Thus, this embodiment of a lock deflection device having a force delimiting and blocking function can be realized by a single punched-out part (out of a metal) that can be enclosed at least in sections by a plastic.

In an alternative variant of the invention, the movable area is designed as a separate part that that is connected to the carrier part through an additional fastening means, wherein in particular said fastening means can be a welded connection, a rivet connection or a screw connection.

With respect to these two embodiments, the movable area can be essentially designed U-shaped, thus comprising a central bar, from which two side arms protrude, each of which comprises a free end region, wherein the movable area is connected to said carrier part through these free end regions, respectively. Via the two free end regions, the movable area is particularly integrally formed with the carrier part or is connected to the separately formed carrier part via the aforedescribed fastening means. Here, the end regions can overlap the carrier part in sections.

Preferably, the first contact area of the lock deflection device is provided at a through-opening of the lock deflection device, through which the safety belt is passed. Thereby, said through-opening can be formed in the movable area itself. It is also possible to openly guide the safety belt at the movable area, i.e., the through-opening of the lock deflection device for guiding the safety belt is formed (at least in the initial position of the movable area) through the central bar of the movable area and said carrier part.

The second contact area can be integrally formed with the lock tongue, e.g. through the carrier part, from which the lock tongue goes off. The second contact area can be designed as a separate part that can be releasably connected to the lock tongue, particularly by screwing, or non-releasably, particularly by spraying, casting, welding, or riveting. Preferably, the second contact area comprises a structured surface for increasing the friction between the second contact area and the safety belt.

In order to arrest the first contact area in its initial position, the first contact area or the movable area is preferably connected to the carrier part of the lock tongue through a connection in the initial position. Here, the first contact area or the movable area can be integrally formed with the carrier part or the lock tongue via said connection. Alternatively to this, said connection can be formed by a welded connection (point-like welded connection), a rivet connection/bolt connection having a predetermined tearing point, or a latching connection. In case of a rivet connection, the bolts are afterwards plastically deformed for fixation; in case of the bolt connection, the bolts are provided with an over-size with respect to the receiving boreholes, and thus must be pressed in; then, a successive deformation is no longer necessary.

The connection is particularly designed such that it tears apart or is released in the beginning of the movement of the first contact area into the final position, wherein the connection can be released by destruction or non-destructively in principle. Provided there is no integral forming of the movable area with the carrier part via said connection, the movable area preferably overlaps the carrier part in the region of the connection, so that said connection is formed between regions of the carrier part or the movable area lying on top of one another.

In a variant, the second contact area is formed by a punched-out flap of the lock deflection device, which, for forming the second contact area, is turned over or rolled.

Generally, the deflection device preferably comprises a base body which particularly consists of a metal, wherein the base body can be punched-out or cut-out out of a metal blank.

In the one embodiment, in case of which the movable area is formed as a separate part, the base body is thereby formed by the carrier part as well as the lock tongue going off therefrom. Furthermore, in this respect, the base body can comprise the second contact area.

In the other embodiment of the invention, in case of which the movable area is integrally formed with the carrier part, the base body comprises the carrier part, the lock tongue and the movable area as well as particularly also the two contact areas. The carrier part, the movable area and the lock tongue are thereby preferably integrally formed with one another and are preferably given as a uniform and, as the case may be, punched-out part.

The base body formed in this way can in each case be surrounded at least in sections by a covering that particularly consists of a plastic. Thereby, the covering can be formed by coating the base body or the carrier part.

Preferably, the covering comprises a recess for receiving the movable area, i.e., the movable area can be particularly embedded into said recess, so that it does not project beyond the covering across an extension plane spanned by the carrier part, and is thus fitted flush into the covering.

Particularly, the connection for arresting the movable area in the initial position can be formed as a latching connection between the covering and the movable area, in case of which the movable area preferably engages behind a region of the covering.

Further features and advantages of the invention shall be clarified by means of the following description of embodiments of the invention with reference to the Figures.

In case of the lock deflection devices (having lock tongues) shown in the Figures, the illustration of the coverings (particularly plastic coatings), which can surround the shown base bodies, was partly omitted for reasons of a better overview.

FIG. 1 shows a first embodiment (front view with belt course) in a basic position (or initial position); the movable area 8 (deformation element, force delimiting function) with first contact area 3 and the second contact area 7 (stopping function) are integrated into the lock tongue 2 (in one piece), i.e., all afore-stated parts are integrally formed with one another in the form of a uniform base body 13 (e.g. in the form of a punched-out part).

So, the movable area 8 is essentially formed u-shaped, i.e., it comprises two side arms 81, 82 and a central bar 80, wherein the two side arms 81, 82 go off from the central bar 80 and each comprise an end region 83 via which the movable area 8 is connected to a carrier part 20 of the lock deflection device 1, from which the lock tongue 2 of the lock deflection device 1 goes off, wherein in the lock tongue 2 is particularly formed integrally with the carrier part 20. According to FIG. 1, the movable area 8 is integrally formed with the carrier part 20 via said end regions 83, wherein said carrier part 20 surrounds the movable area 8 in the extension plane of the movable area 8, which is spanned by its central bar 18 as well as the arms 81 and 82, on all sides i.e., the carrier part 20 comprises a central continuous recess in which the movable area 8 is arranged at least in its initial position.

The lock tongue 2 extends particularly inclined with respect to the extension plane of the carrier part 20 or the movable area 8 (with respect to the initial position of the movable area).

In the central bar 80 of the movable area 8, a through-opening 25 is formed through which a safety belt 4 is passed, wherein the safety belt 4 runs, in the form of a shoulder segment 5, along a first belt course direction V to the through-opening 25 and is there deflected at a first contact area 3 delimiting the through-opening 25 at least in sections and goes off from the first contact area 3, as a pelvis segment 6, along a second belt course direction V' (cf. also FIGS. 6 and 7).

Thereby, during an intended use of the lock deflection device 1, in case of a safety belt 4 in the form of a three-point safety belt, the pelvis segment 6 of the safety belt 4 runs in the second belt course direction V' along the pelvis of an occupant belted with the safety belt 4, and the shoulder segment 5 of the safety belt 4 runs diagonally over the upper body of the occupant along the first belt course direction V.

The movable area 8 can be moved in the direction of the shoulder segment 5 (cf. also FIG. 7) by means of the safety belt 4 out of an initial position according to FIG. 1, in which the movable area 8 extends along the extension plane of the carrier part 20 (cf. also FIG. 6), wherein it is particularly bent out of said extension plane. This deformation, which in particular takes place plastically (inelastically), is similar to a pivoting movement, since the movable area 8 is particularly bent or deformed in the region of its end regions 83. Said pivoting movement out of the initial position into a final position different therefrom, takes place above a pre-definable minimal force acting on the shoulder segment 5 in the case of restraint. Due to said movement of the movable area 8, the resulting force acting on the safety belt 4 (the shoulder segment 5) is delimited in order to protect the occupant.

Preferably, the safety belt 4 (particularly the pelvis segment 6) does not contact the second contact area 7 until the movement of the movable area 8 out of the initial position into the final position takes place, which second contact area 7 is designed such that it at least significantly blocks, or, as the case may be, stops (cf. FIG. 7) the belt pass through the lock deflection device 1, i.e., a free sliding-along of the safety belt 4 on the first contact area 3 or through the through-opening 25. Thereby, the safety belt 4 can run, according to FIG. 7, between the first and the second contact area along a third belt course direction V''', which is different from the first and second belt course directions V, V' or runs inclined with respect to these belt course direction V, V'.

Figure 2:
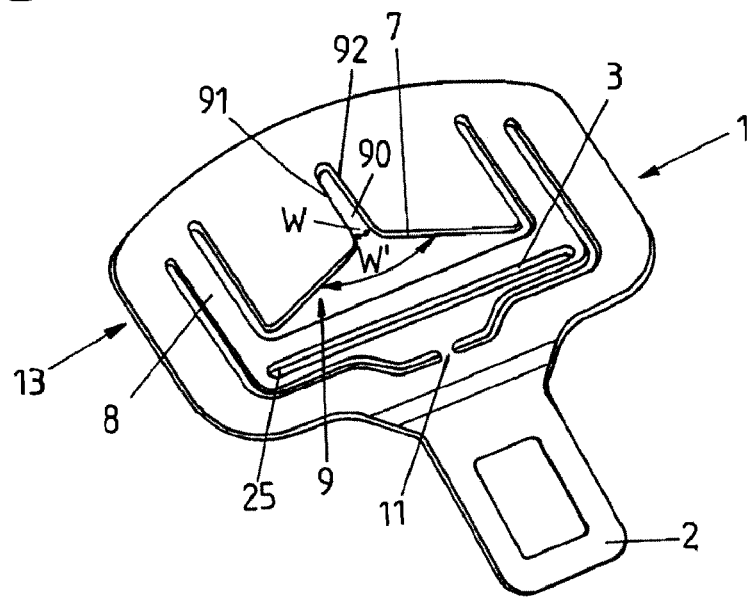
FIG. 2: shows a modification of the lock deflection device shown in FIG. 1, having a connection between the movable area and the carrier part for arresting the movable area in its initial position.

For blocking or stopping (complete blocking) the belt pass, the second contact area 7 can be foamed according to FIG. 1 as a boundary region of the carrier part 20, that delimits a tapered, particularly (essentially) wedge-shaped cutout 9 in the carrier part 20, wherein said wedge-shaped cutout (cf. also FIG. 8) comprises a chamfer 90, i.e. a portion of the cutout 9, in which opposing edges 91, 92 of the cutout 9 enclose a significantly smaller angle W than outside said portion (angle W'), cf. FIG. 2. In case the safety belt 4 starts butting against the second contact area 7 formed in this manner, the safety belt 4 is drawn into said cutout 9 by the forces acting on it, particularly into said chamfer 90, which causes (, as the case may be, the complete) blocking of the belt pass through the lock deflection device 1.

Due to the simultaneous blocking of the belt pass and the release of the shoulder segment 5 by the movement of the movable area 8, the force that is induced in the case of restraint through the shoulder segment 5 into the upper body (particularly thorax) of the occupant is decreased in particular, in order to protect the occupant from belt-caused injuries.

FIG. 2 shows a further embodiment (front view without belt course) having a movable area 8 in the basic position (initial position). Generally, this embodiment corresponds to the embodiment shown in FIG. 1. The movable area 8 is here fixed through an additional connection 11 to the lock deflection device 1, wherein said connection 11 connects the central bar 80 of the movable area 8 to the carrier part 20, so that said connection 11 is arranged between the central bar 80 (in the initial position) and the lock tongue 2. At hand, the connection 11 is formed as a bar, via which the central bar 80 is integrally formed with the carrier part 20, and as a connection that can be released (torn open) above a certain force. The tearing-open-region secures the position of the movable area 8 in the normal situation of use of the belt system and guarantees that a movement (pivoting) of the movable area 8 in the case of a crash does not take place until the defined force level is reached.

Figure 3:
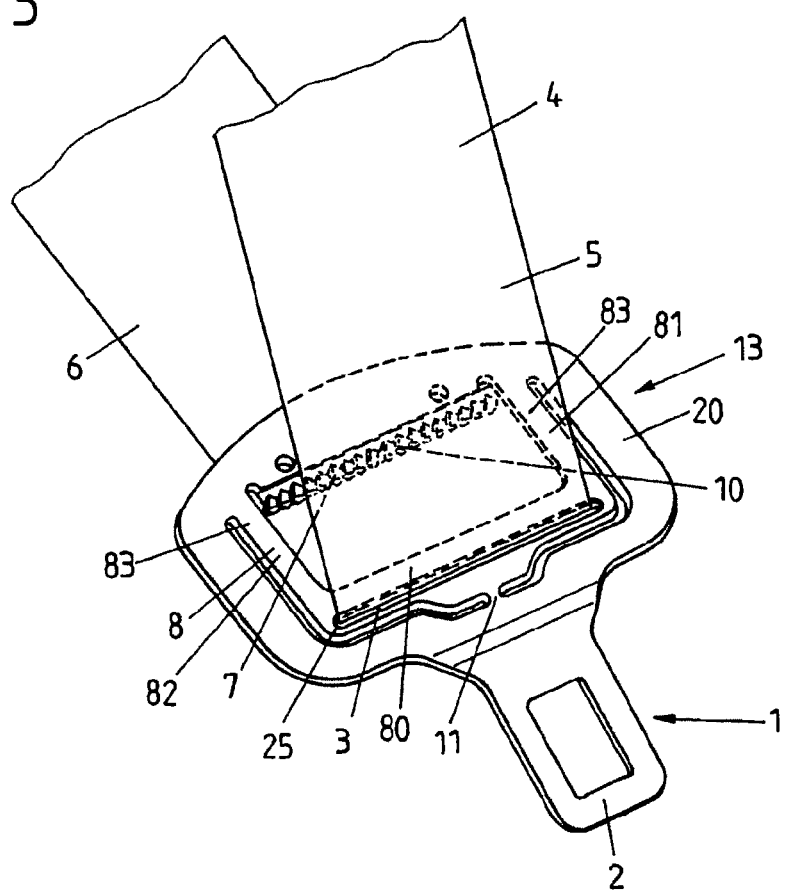
FIG. 3: shows a modification of the lock deflection device shown in FIGS. 1 and 2, in case of which the second contact area of the lock deflection device is not provided at a tapered cutout for restraining the belt pass, but comprises a surface for increasing the friction between the safety belt and the lock deflection device.

FIG. 3 shows the upper side of a further embodiment of a lock deflection device 1 according to the invention (front view with belt pass) in the basic position, which upper side faces the shoulder segment 5 in the intended case of use, i.e., having a movable area 8 in the initial position. In contrast to the FIGS. 1 and 2, the second contact area 7 is no longer an integral part of the lock deflection device 1 (i.e., no longer integrally formed), but is designed as a separate part and connected to a part, particularly to the carrier part 20 of the lock deflection device 1, in a suitable manner (releasably—e.g. screwed; non-releasably—e.g. sprayed/casted, riveted). An advantage of this embodiment is that the second contact area 7 can be adapted more easily with respect to its blocking function via a corresponding structuring.

Figure 4:
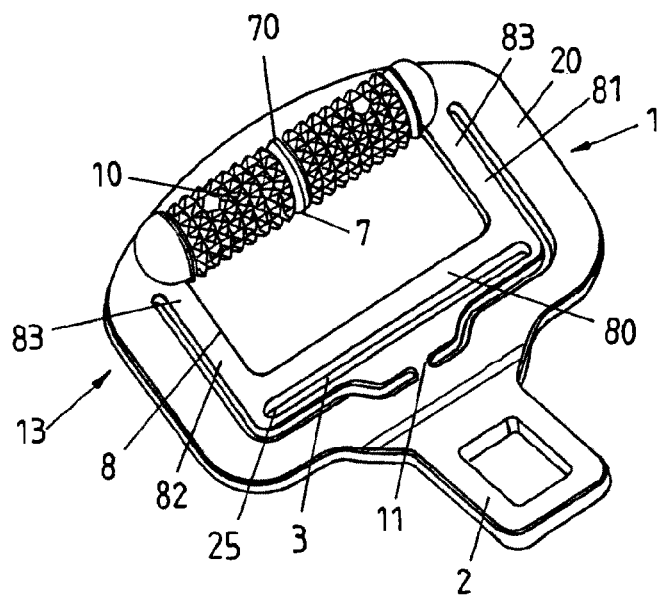
FIG. 4: shows a further view of the lock deflection device shown in FIG. 3.

FIG. 4 shows the lower side of the lock deflection device 1 facing away from the upper side according to FIG. 3 (rear view without belt pass) in the basic position, i.e., having a movable area 8 in the initial position, wherein it can be recognized here, that the second contact area 7 is formed cylinder-barrel-shaped in sections, and comprises a surface 10 having a surface structure, which, compared to the first contact area 3, causes a higher friction between the safety belt 4 and the second contact area 7. Thereby, the second contact area 7 can comprise one or several bars 70 on which the safety belt 4 can slide along, provided the forces acting on it are not too high, wherein the safety belt 4 completely butts against the surrounding structured surface 10 of the second contact area above a certain minimal force, so that the friction between the second contact area 7 and the safety belt 4 is correspondingly increased.

FIG. 5 shows a further embodiment (rear view without belt pass) in the basic position, i.e., having a movable area in the initial position. Here, again a completely integral embodiment is shown, i.e., all parts are integrally formed with one another. The second contact area 7 is formed by a middle part of the lock deflection device 1 or the carrier part 20, which is partly punched-out in the form of a flap 12 and is turned over/rolled. Before the turning-over, a structure is embossed into the second contact area 7, which is provided for the later contact to the pelvis segment 6, or into its surface 10, so that the friction between the safety belt 4 and the second contact area 7 (compared to the first contact area 3) is increased.

FIGS. 6 and 7 each show a side view of a lock deflection device according to the invention according to FIGS. 3 to 5 with a belt pass from which one can also recognize the belt pass of the other embodiments.

Thereby, FIG. 6 shows a lock deflection device 1 in the normal situation of use (basic position), in case of which the movable area 8 resides in the initial position and the pelvis segment 6 is not in contact with the second contact area 7.

Furthermore, FIG. 7 shows the belt deflection device 1 in the case of a crash, i.e., after a movement of the movable area 8 out of the initial position into the final position, in which the safety belt 4 butts against the second contact area 7 in addition, and therefore the belt pass of the safety belt 4 through the lock deflection device 1 is blocked or stopped.

The movement of the movable area 8 into the final position thereby takes place when a force acting in the shoulder segment 5 in the direction of an upper belt deflection point (counter to the first belt course direction V) releases the connection 11 between the movable area 8 and the belt deflection element 1 (in the tearing-open-region of the connection 11) upon reaching a defined level. The force, induced via the first contact area 3 into the movable area 8 therefore leads to the movement (the pivoting) of the movable area 8 out of the initial position into the final position. During the movement (above a certain pivoting angle) the pelvis segment 6 contacts the second contact area 7, wherein the contact forces increase with the further movement or with increasing pivoting angle. In case forces arise, which are induced via the pelvis segment 6, the displacement of the safety belt 4 in the first or second belt course direction V, V' from the shoulder segment 5 towards the pelvis segment 6 is completely suppressed, or is only possible on a significantly higher force level. In contrast, in case forces are induced via the shoulder segment 5, a displacement of the safety belt counter to the first or second belt course direction V, V' from the pelvis segment 6 towards the shoulder segment 5 is possible.

Figure 8:
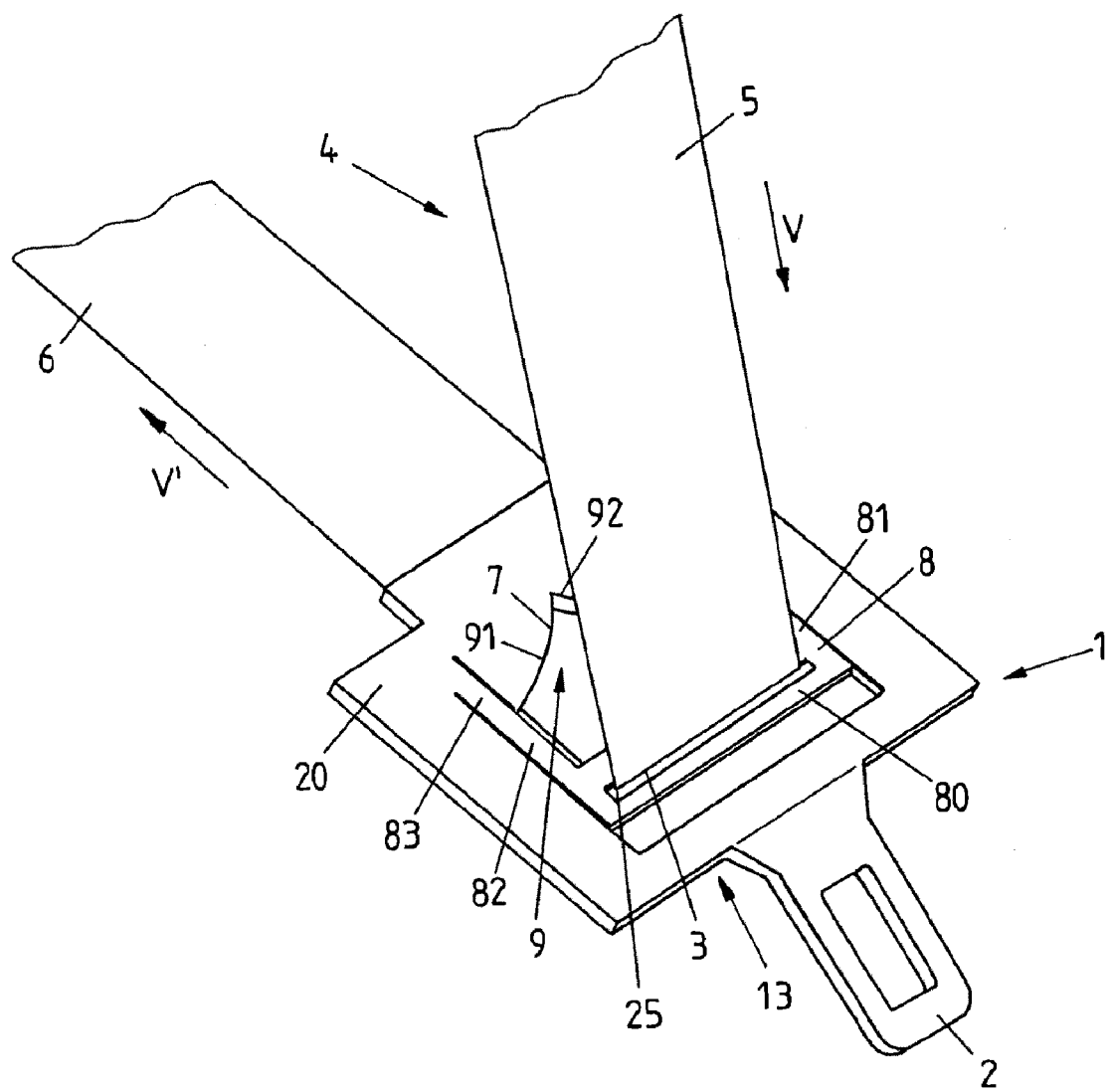
FIG. 8: shows a further lock deflection device having an integrally formed movable area and having a second contact area and a cutout of the carrier part for restraining the belt pass being tapered continuously stronger.

FIG. 8 shows a further lock deflection device 1 according to the invention, which essentially corresponds to FIG. 1, wherein at the cutout 9, in contrast to FIG. 1, no delimited chamfer 90 is provided, but the cutout 9 is tapered continuously stronger, so that the two edges 91, 92 delimiting the cutout 9 and converging towards one another taper acutely and are thereby curved convexly, respectively.

FIG. 9 shows a further embodiment of a lock deflection device 1 according to the invention, in case of which, in contrast to the FIGS. 1 to 8, the movable area 8 is formed as a separate part, that is fastened to the carrier part 20 by means of an additional fastening means 85, namely on an upper side of the carrier part 20 facing the shoulder segment 5 in the intended case of use, so that the movable area 8 is arranged above a central recess of the carrier part 20, which is annularly (circularly) surrounded or delimited by the carrier part 20. Thereby, the movable area 8 comprises a central bar 80, from which two side arms 81, 82 go off, each having a free end region 83. Via these two free end regions 83, the movable area 8 is fixed to the carrier part 20 by means of the fastening means 85, respectively, wherein the two end regions 83 overlap the carrier part 20 in sections. In case of a welded connection between the end regions 83 and the carrier part 20, said connection is therefore formed between the respective end region 83 and the carrier part 20. Alternatively, the fastening means 85 can be formed as a rivet, bolt, or screw connection, in case of which a rivet, a bolt or a screw connects the respective end region 83 to the carrier part 20, namely such, that the upper side of the lock deflection device 1 or the carrier part 20 faces the movable area 8 or its end regions 83.

According to FIG. 9, the central bar 80 protrudes with two end portions 80a, 80b along its longitudinal axis, along which it extends, beyond the side arms 81, 82, wherein from said end portions 80a, 80b extensions 80c, 80d go off counter to the side arms 81, 82, i.e., are arranged on both sides of the first contact area 3, which prevent the safety belt 4 from laterally slipping from the first contact area 3. In addition, the carrier part 20 contributes, particularly in the initial position of the movable area 8, to the guiding of the safety belt 4, since the first contact area 3 formed on the central bar 80 and the extensions 80c, 80b going off therefrom form together with a side of the carrier part 20 facing the first contact area 3 a through-opening 25 for the safety belt 4. This is an alternative with respect to the embodiments according to FIGS. 1 to 8, in case of which the safety belt 4 is passed through a through-opening 25 which is completely formed in the movable area 8. Furthermore, the first contact area 3 can comprise a convex bulge 86, which also serves for securely guiding the safety belt 4 on the first contact area 4.

The end portions 80a, 80b of the central bar 80 of the movable area 8 with the extensions 80c, 80d going off therefrom overlap in the initial position of the movable area 8 the upper side of the carrier part 20 in sections, respectively.

FIG. 9 merely shows a base body 13 of a lock deflection device 1 according to the invention formed by the carrier part 20 and the lock tongue 2 protruding therefrom, with the separately designed movable area 8 fastened thereto, wherein the base body 13 is surrounded in addition in sections by a covering 130, particularly out of a plastic, which can be applied to the base body 13 by coating the base body 13, wherefore according to FIG. 9 openings 26 are provided at the carrier part 20, in order to improve the grip of the covering 130 on the base body 13. Particularly, said covering 130 encloses the carrier part 20, wherein the lock tongue 2 protrudes out of the covering 130, i.e., is not covered by the covering 130.

Preferably, a recess 131 is provided in the covering 130, in which recess 131 the movable area 8 is embedded in its initial position in a way that it does not protrude along a normal to the extension plane of the carrier part 20 out of the covering 130. Of course, the presence of such a covering 130 is not mandatory.

Figure 18:
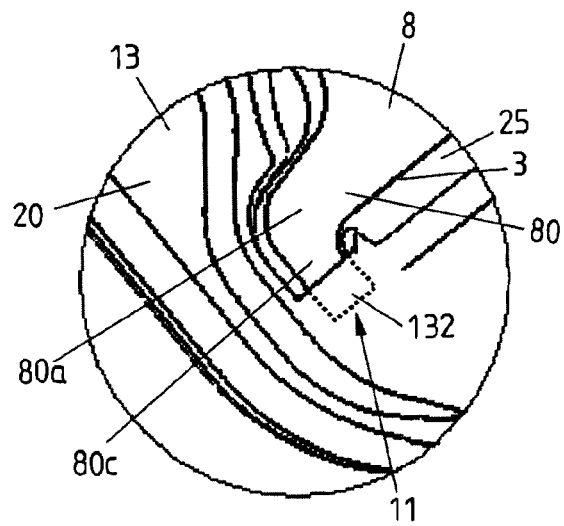
FIG. 18: shows a connection between the movable area and the carrier part in the form of a further latching connection in case of a lock deflection device according to FIGS. 9-11 or 12-14.

The covering 130 can further comprise, according to FIG. 18, an undercut 132 in the region of the extensions 80c, 80d of the movable area 8, which undercut 132 is engaged in the initial position of the movable area 8 by an associated extension 80c, 80d of the movable area 8, respectively, so that, as said connection 11, a latching connection between the movable area 8 and the carrier part 20 is provided, which allows for a movement of the movable area 8 out of the initial position into the final position not until a certain minimal force is reached.

Figure 17:
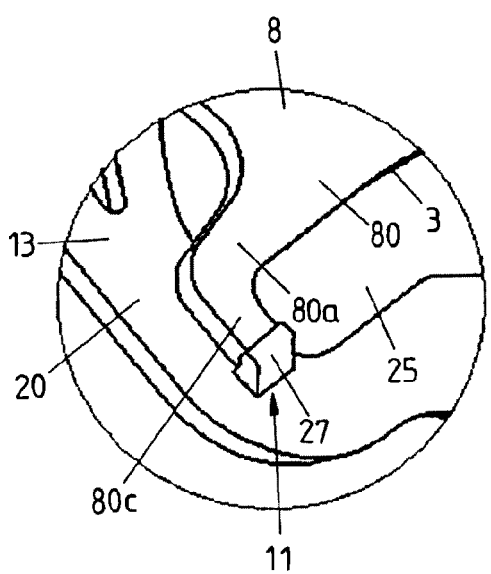
FIG. 17: shows a connection between the movable area and the carrier part in the foam of a latching connection in case of a lock deflection device according to FIGS. 9-11 or 12-14.

As an alternative to this, there exists the possibility according to FIG. 17, that said extensions 80c, 80d each engage behind a latching region 27 formed on the carrier part 20 and protruding therefrom, which can be particularly integrally formed with the upper side of the carrier part 20.

Figure 15:
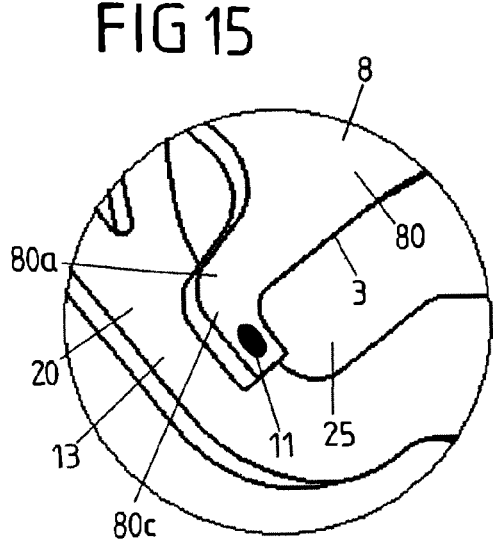
FIG. 15: shows a connection between the movable area and the carrier part in the form of a welded connection in case of a lock deflection device according to FIGS. 9-11 or 12-14.

Furthermore, the possibility exists, that the movable area 8, for forming said connection 11, is connected by a welded connection (point-like welded connection) to the carrier part 20 according to FIG. 15, wherein said welded connection defines a predetermined tearing point that is torn above a certain minimal force, so that the movable area 8 can move out of the initial position into the final position. Preferably, said connection 11 connects the two extensions 80c, 80d to the carrier part 20, respectively.

Figure 16:
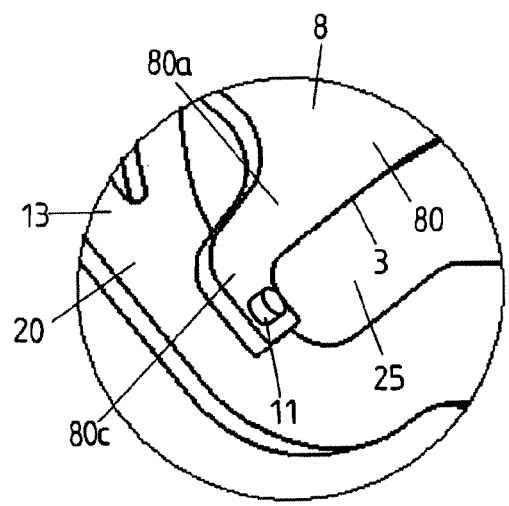
FIG. 16: shows a connection between the movable area and the carrier part in the form of a bolt connection or a rivet connection in case of a lock deflection device according to FIGS. 9-11 or 12-14.

Instead of a welded connection, also a rivet or bolt connection having a predetermined tearing point can be provided according to FIG. 16.

Similar to the FIGS. 1 and 2, the second contact area 7 delimits, according to FIGS. 9 to 11, a concave cutout 9 of the carrier part 20, that comprises an additional chamfer 90, so that the belt pass during butting of the safety belt 4 against the second contact area 7 is blocked or, as the case may be, stopped.

The FIGS. 12 to 14 show a modification of the embodiment shown in FIGS. 9 to 11, in case of which, in contrast to FIGS. 9 to 11, no second contact area 3 is provided at a tapered cutout 9, but a second contact area 7 according to the kind of FIGS. 3 to 5.

The priority application, German Patent Application No. 10 2008 037 963.8, filed Aug. 13, 2008, including the specification, drawing, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed from the present disclosure within the scope and spirit of the present invention are to be included as further embodiments of the present invention. The scope of the present invention is to be defined as set forth in the following claims.

The invention claimed is:

1. A lock deflection device for a motor vehicle for deflecting a seat belt, comprising:
   a lock tongue for insertion into a lock buckle;
   a first contact area connected to the lock tongue around which the seat belt can be laid to deflect the seat belt, so that the seat belt is divided into a shoulder segment and a pelvis segment, which go off in different directions from the first contact area, wherein the first contact area can be moved from an initial position, in which the seat belt can slide along on the deflection device, into a final position; and
   a second contact area connected to the lock tongue, which is arranged to contact the seat belt after the first contact area is moved out of the initial position, in order to restrain the seat belt from sliding along on the deflection device,
   wherein the first contact area is connected to the lock tongue through a movable area of the lock deflection device,
   wherein the movable area is designed to interact with the seat belt in a way that the movable area performs a movement due to a force acting on the shoulder segment such that the first contact area is taken along from the initial position to the final position,
   wherein the movement comprises a deformation of the movable area accompanied by a pivoting movement, and
   wherein the first contact area is integrally formed with the movable area.

2. The lock deflection device as claimed in claim 1, wherein upon movement of the first contact area into the final position, the second contact area is not changed in its position with respect to the lock tongue.

3. The lock deflection device as claimed in claim 1, wherein the first contact area is integrally formed with the lock tongue through the movable area.

4. The lock deflection device as claimed in claim 1, wherein the lock deflection device comprises a carrier part for carrying the movable area, wherein the second contact area is provided on the carrier part, and wherein the lock tongue goes off from said carrier part.

5. The lock deflection device as claimed in claim 4, wherein the movable area is designed as a separate part that is connected to the carrier part through a welded connection, a rivet connection or a screw connection.

6. The lock deflection device as claimed in claim 4, wherein the movable area comprises a central bar from which two side arms go off, each of which comprises a free end region, and wherein the movable area is connected to the carrier part through the free end regions of the side arms.

7. The lock deflection device as claimed in claim 4, wherein the first contact area or the movable area is connected to the carrier part or the lock tongue in the initial position by a connection, in order to arrest the first contact area in its initial position.

8. The lock deflection device as claimed in claim 1, wherein the movable area is integrally formed with the carrier part or is integrally formed with the lock tongue through the carrier part.

9. The lock deflection device as claimed in claim 1, wherein the first contact area is formed at a through-opening of the lock deflection device, through which the seat belt can be passed.

10. The lock deflection device as claimed in claim 9, wherein the through-opening is formed in the movable area.

11. The lock deflection device as claimed in claim 1, wherein the second contact area is integrally formed with the lock tongue.

12. The lock deflection device as claimed in claim 1, wherein the second contact area is formed as a separate part that is releasably connected to the lock tongue by screwing, or non-releasably by spraying, casting, welding or riveting.

13. The lock deflection device as claimed in claim 1, wherein the second contact area comprises a structured surface for increasing the friction between the second contact area and the seat belt.

14. The lock deflection device as claimed in claim 1, wherein the deflection device comprises a base body that is punched-out of a metal blank.

15. The lock deflection device as claimed in claim 14, wherein the base body is formed by a carrier part and the lock tongue going off therefrom.

16. The lock deflection device as claimed in claim 14, wherein the base body comprises a carrier part, the lock tongue, the movable area, and the first and second contact areas.

17. The lock deflection device as claimed in claim 14, wherein the base body is surrounded by a covering at least in sections, the covering being made out of a plastic.

* * * * *